United States Patent [19]

Sauer et al.

[11] 4,261,199

[45] Apr. 14, 1981

[54] AIR FLOW MEASUREMENT APPARATUS

[75] Inventors: Rudolf Sauer, Benningen; Wolfgang Kienzle, Schwieberdingen, both of Fed. Rep. of Germany

[73] Assignee: Robert Bosch GmbH, Stuttgart, Fed. Rep. of Germany

[21] Appl. No.: 65,238

[22] Filed: Aug. 9, 1979

[30] Foreign Application Priority Data

Nov. 17, 1978 [DE] Fed. Rep. of Germany ....... 2849870

[51] Int. Cl.$^3$ ............................................... G01F 1/68
[52] U.S. Cl. ....................................... 73/204; 73/116
[58] Field of Search .................................. 73/204, 116

[56] References Cited

U.S. PATENT DOCUMENTS 4,089,215  5/1978  Chapin ................................. 73/116

FOREIGN PATENT DOCUMENTS 2749575  5/1979  Fed. Rep. of Germany ............. 73/204

Primary Examiner—Herbert Goldstein
Attorney, Agent, or Firm—Edwin E. Greigg

[57] ABSTRACT

An air flow measurement apparatus is proposed for measuring the air quantity aspirated by internal combustion engines, which has at least one temperature-dependent resistor disposed in the air flow, whose temperature and/or resistance is controlled in accordance with the flow rate to provide a controller output as a gauge for the quantity of the medium. The apparatus includes a flow restriction, which is preferably formed in plate-like configuration with a wedge-shaped cross section and the narrow tip facing into the air flow and is disposed in the flow downstream of the temperature-dependent resistor in such a manner that in the event of a flow reversal, such as during backfiring in the intake manifold of an internal combustion engine, the flow restriction reduces the flow velocity in the vicinity of the temperature-dependent resistor.

3 Claims, 2 Drawing Figures

AIR FLOW MEASUREMENT APPARATUS

BACKGROUND OF THE INVENTION

The invention relates to an air flow measurement apparatus. An air flow measurement apparatus in which a hot wire is used as the temperature-resistant resistor in the intake manifold of an internal combustion engine is already known. In such an apparatus, however, there is the danger that in backfiring (that is, when the direction of flow is reversed), the hot wire is destroyed by the pressure waves and high flow velocities in the intake manifold which then occur.

OBJECT AND SUMMARY OF THE INVENTION

The apparatus in accordance with the invention has the advantage over the prior art that in the event of backfiring in the intake manifold of an internal combustion engine, that is, a shock-like flow reversal across a measurement location, the flow velocity is reduced in the region of the temperature-dependent resistor and thus the destruction of this resistor is prevented.

The invention will be better understood as well as further objects and advantages thereof become more apparent from the ensuing detailed description of a preferred embodiment taken in conjunction with the drawings.

DESCRIPTION OF THE PREFERRED EMBODIMENT

Figure 1:
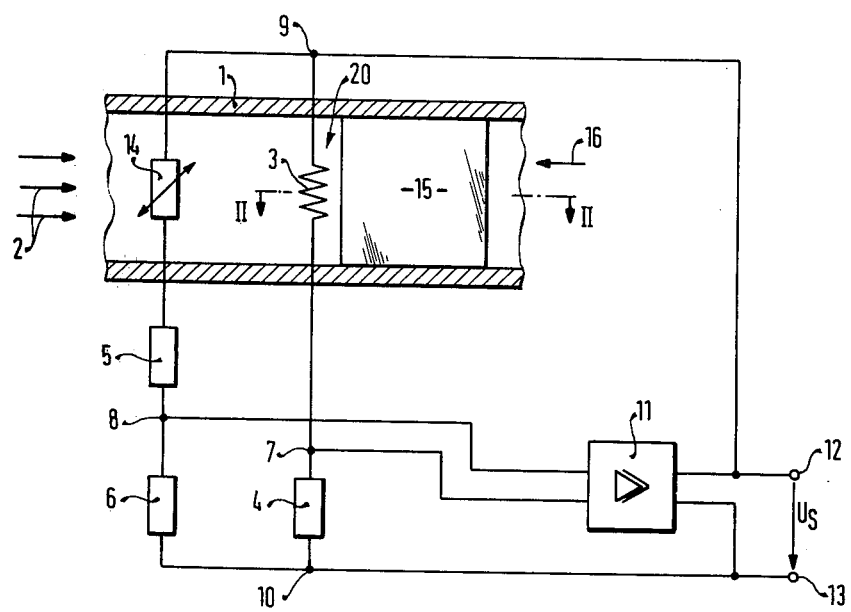
FIG. 1 is a circuit diagram for an air flow measurement apparatus having a flow restriction constructed in accordance with the invention.

The air flow measurement apparatus of the invention is used, as an example, for the measurement of a quantity of air aspirated by an internal combustion engine. Referring now to FIG. 1, there is shown an induction tube 1 incorporated in the intake manifold of an internal combustion engine (not shown) through which air flows in the direction of the arrows 2. The induction tube 1 includes a measurement sensor 20 having at least one temperature-dependent resistor 3, for example a hot wire or hot film, which carries an electrical current of controlled magnitude and which supplies the actual value signal for a controller 11.

The controller 11 maintains the temperature of the resistor 3 at a level somewhat above the average air temperature. If the air flow rate increases, i.e., the velocity of the flowing air increases, the temperature of the resistor 3 tends to drop. This drop in temperature results in a change of resistance and hence a change in the voltage drop across the resistor 3 which is sensed at the input of the controller 11, which thereby changes its output current until the predetermined temperature of the resistor 3 is attained again. Thus the controller 11, preferably in the form of a differential amplifier, continuously attempts to hold the temperature of the resistor 3 at a constant temperature in spite of fluctuations in the air flow rate, so that its output current at the same time may be used in a fuel metering system to adapt the quantity of fuel required by the engine to the prevailing air flow rate.

The measuring resistor 3, which is temperature-dependent, may be connected in series with a fixed resistor 4 in a first arm of a measuring bridge which has a second arm consisting of series-connected fixed resistors 5 and 6. The two arms of the bridge are connected in parallel at junctions 9 and 10. There is a pickup point 8 between resistors 5 and 6, and a pickup point 7 is located between the measuring resistor 3 and the resistor 4. The diagonal voltage of the bridge which appears between the pickup points 7 and 8 is applied to the input of the controller or differential amplifier 11. The points 9 and 10 are connected across the outputs of the differential amplifier 11 and are thus supplied with operating voltage or current.

The output voltage of the differential amplifier 11, designated $U_S$, may be used externally, at contacts 12 and 13, for the purpose of providing an input signal to fuel management systems and the like. In particular, the signal $U_S$ may be used to control the amount of fuel supplied to the engine for the prevailing air flow rate in a known but unillustrated fuel metering system. Thus an optimum fuel-air mixture can be attained for maximum output with the lowest possible proportion of toxic exhaust components.

The current flowing through the temperature-dependent resistor 3 heats this resistor 4 until the input voltage to the differential amplifier 11 equals the bridge diagonal voltage, zero, or some different, predetermined voltage. The output of the amplifier 11 is thus a controlled current flowing into the bridge circuit. If the air flow rate changes, the temperature of the resistor 3 also changes, as does its resistance, which causes a change in the voltage difference between the points 7 and 8, causing the amplifier 11 to correct the output current supplied to the points 9 and 10 until such time as the bridge is balanced or has reached a predetermined degree of imbalance. Accordingly, the output voltage $U_S$, as well as the current through the resistor 3, constitute a measure for the prevailing air flow rate.

In order to compensate for the influence of the temperature of the aspirated air on the measured result, it may be suitable to supply a second temperature-dependent compensating resistor 14 in the second arm of the bridge. The magnitude of the resistances of the resistors 5, 6 and 14 should be so chosen that the power loss due to the current flowing through the second temperature-dependent resistor 14 is so low that its temperature is unaffected by changes of the bridge voltage but always corresponds substantially to the temperature of the air flowing around it.

Figure 2:
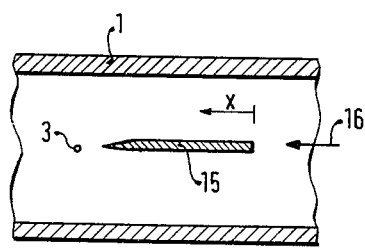
FIG. 2 is a section taken along the line II—II of FIG. 1 in the direction of the arrows.

Downstream of the temperature-dependent resistor 3, a flow restriction 15 is disposed in the induction tube 1 of the intake manifold of the engine. As shown best in FIG. 2, this flow restriction 15 is preferably formed in a plate-like configuration. The cross section of the flow restriction 15 is advantageously wedge-shaped, with the narrow tip of the flow restriction 15 facing into the air flow. The flow restriction 15 is disposed in an air flow traveling in the direction of the arrows 2 in the lee, or flow shelter, offered by the temperature-dependent resistor 3.

In the event of possible backfiring in the intake manifold of an engine, with a simultaneous flow reversal in the direction of the arrow 16, high flow velocities and pressure waves occur, which can cause the destruction of the temperature-dependent resistor 3. By disposing the flow restriction 15 facing a flow in the direction of the arrows 2 downstream of the temperature-dependent resistor 3, however, a boundary layer is caused to be formed in the air flow at the flow restriction 15 in the event of backfiring, which severely reduces the flow velocity.

In accordance with the invention, the temperature-dependent resistor 3 is intended to lie in the vicinity of the reduced flow velocity caused by the flow restriction 15 in the event of backfiring, so that destruction of the temperature-dependent resistor 3 is prevented. The thickness of the boundary layer which builds up at the flow restriction 15 is in proportion to $\sqrt[4]{x}$, where x is the length of the flow restriction. When the air flow is in the direction of the arrows 2, the flow at the temperature-dependent resistor 3 is not affected by the wedge-like conformation of the flow restriction 15.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. An air flow measurement apparatus for the measurement of the air aspirated by internal combustion engines including at least one temperature-dependent resistor in the form of a hot wire disposed in the air flow, whose temperature and/or resistance is controlled in accordance with the flow rate, and a controller having an output connected to said resistor which provides a gauge for the quantity of the flowing air, an axially aligned flow restriction disposed in the air flow parallel therewith downstream of said temperature-dependent resistor in axial alignment therewith whereby in the event of a flow reversal, said flow restriction effects a reduction of the flow velocity in the vicinity of the temperature-dependent resistor.

2. An apparatus in accordance with claim 1 wherein said flow restriction has a plate-like configuration.

3. An apparatus in accordance with claim 2 wherein said flow restriction is wedge-shaped in cross section having a narrow tip, said flow restriction being disposed so that said narrow tip points in the opposite direction from the direction of the air flow.

* * * * *